United States Patent
Vogt et al.

[11] Patent Number: 5,296,522
[45] Date of Patent: Mar. 22, 1994

[54] ELECTRICAL MEDIUM AND HIGH VOLTAGE CABLE WITH A CABLE SHEATH HAVING HIGH RESISTANCE TO THE FORMATION AND THE GROWTH OF WATER TREES

[75] Inventors: Heinz Vogt, Ludwigshafen; Ingolf Hennig, Bensheim; Johannes Schlag, Ludwigshafen, all of Fed. Rep. of Germany; Thomas Muehlenbernd, Tokyo, Japan

[73] Assignee: BASF Aktiengesellschaft, Ludwigshafen, Fed. Rep. of Germany

[21] Appl. No.: 880,380

[22] Filed: May 8, 1992

[30] Foreign Application Priority Data

| May 15, 1991 | [DE] | Fed. Rep. of Germany | 4115751 |
| May 15, 1991 | [DE] | Fed. Rep. of Germany | 4135201 |
| May 15, 1991 | [DE] | Fed. Rep. of Germany | 4135202 |
| Dec. 14, 1991 | [DE] | Fed. Rep. of Germany | 4141272 |
| Dec. 14, 1991 | [DE] | Fed. Rep. of Germany | 4242273 |

[51] Int. Cl.$^5$ ............................................. C08K 5/09
[52] U.S. Cl. ................... 524/300; 524/320; 524/321; 524/322
[58] Field of Search ............ 524/300, 320, 321, 322, 524/315, 495, 496, 897, 441

[56] References Cited

U.S. PATENT DOCUMENTS

| 3,255,134 | 6/1966 | Rowe | 524/320 |
| 3,394,100 | 7/1968 | Falcone et al. | 524/300 |
| 3,488,306 | 1/1970 | Thormahlen | 524/320 |
| 3,493,537 | 2/1970 | Salyer et al. | 524/300 |
| 3,890,267 | 6/1975 | Fukushima et al. | 524/320 |
| 4,010,127 | 3/1977 | Taka et al. | 524/300 |
| 4,092,488 | 5/1978 | Hayami et al. | 428/222 |
| 4,219,453 | 8/1980 | Sakurai et al. | 524/300 |
| 4,291,131 | 9/1981 | McIntire et al. | 524/321 |
| 4,400,429 | 8/1983 | Barlow et al. | 524/315 |
| 4,492,647 | 1/1985 | Braus | 252/573 |
| 4,536,530 | 8/1985 | Barlow et al. | 524/109 |
| 4,997,713 | 5/1991 | Koehnlein et al. | 428/379 |
| 5,047,482 | 9/1991 | Schlag et al. | 524/522 |

FOREIGN PATENT DOCUMENTS

| 109797 | 11/1983 | European Pat. Off. |  |
| 0297414 | 1/1989 | European Pat. Off. |  |
| 2911756 | 10/1980 | Fed. Rep. of Germany |  |
| 0200433 | 12/1982 | Japan | 524/322 |
| 0011533 | 1/1983 | Japan | 524/320 |
| 0075707 | 5/1983 | Japan | 524/322 |
| 0086252 | 5/1983 | Japan | 524/322 |
| 0086253 | 5/1983 | Japan | 524/322 |
| 0136639 | 8/1983 | Japan | 524/322 |
| 0200141 | 9/1986 | Japan | 524/322 |
| 0283638 | 12/1986 | Japan | 524/322 |
| 0086052 | 4/1987 | Japan | 524/320 |

OTHER PUBLICATIONS

World Patents Index Latest, Derwent Publications Ltd., London, GB, AN 81-82290D.
*World Patents Index Latest,* Derwent Publications Ltd., London, GB, AN 84-032495.

*Primary Examiner*—Paul R. Michl
*Assistant Examiner*—Peter Szekely
*Attorney, Agent, or Firm*—Keil & Weinkauf

[57] ABSTRACT

Carboxylic acids of the general formula I $$R^3-(CH_2)_z-\underset{\underset{R^2}{|}}{\overset{\overset{R^1}{|}}{C}}-(CH_2)_x-COOH \quad (I)$$

where $R^1$, $R^2$ and $R^3$ independently of one another are each hydrogen, hydroxyl, carboxyl or $C_1$-$C_6$-alkyl and x, y and z independently of one another are each 0 or an integer of from 1 to 6, and/or their anhydrides can permanently suppress the formation of water trees in electrical medium and high voltage cables which contain electrically insulating and/or electrically semiconductive layers based on ethylene homopolymers and/or copolymers, even when the relevant layers contain water-soluble basic salts. Accordingly, polymeric mixtures based on ethylene homopolymers and/or copolymers which contain the above-mentioned carboxylic acids I and/or their anhydrides are very useful for the production of electrically insulating and electrically semiconductive layers as used in electrical medium and high voltage cables.

3 Claims, No Drawings

ELECTRICAL MEDIUM AND HIGH VOLTAGE CABLE WITH A CABLE SHEATH HAVING HIGH RESISTANCE TO THE FORMATION AND THE GROWTH OF WATER TREES

The present invention relates to a novel electrical medium and high voltage cable having high resistance to the formation and the growth of water trees, and furthermore to the use of specially selected carboxylic acids and/or anhydrides of these carboxylic acids as inhibitors of the formation or of the growth of water trees in ethylene homopolymers and copolymers under the influence of strong electric fields. The present invention also relates to novel electrically insulating and electrically semiconductive mixtures based on ethylene homopolymers and/or copolymers, which are particularly suitable for the production of the electrically insulating layers or of the electrically semiconductive layers for limiting the electromagnetic field in electrical medium and high voltage cables. The present invention moreover relates to a novel, more stringent test, with the aid of which it is possible beforehand to determine the suitability of polymeric mixtures for the production of electrical medium and high voltage cables.

Electrical medium and high voltage cables are well known. They usually contain one or more electrically semiconductive layers for limiting the electromagnetic field and one or more electrically insulating layers. Both the electrically insulating and the electrically semiconductive layers may consist of polymeric mixtures based on ethylene homopolymers and/or copolymers. The electrically semiconductive layers usually contain large amounts of an electrically conductive pigment.

It is essential that both the electrically insulating and the electrically semiconductive mixtures of which the relevant electrically insulating and electrically semiconductive layers consist have very particular physical, mechanical and electrical properties so that they are suitable for the specific intended uses, under discussion here, in the cable industry. In particular, their resistance to the formation of water trees must be improved in such a way that the relevant cable sheaths with their low but technically unavoidable content of water-soluble salts which initiate water trees do not suffer any damage which reduces the life of the electrical medium and high voltage cables on prolonged application of voltage in the presence of water or atmospheric humidity.

There are many proposals for avoiding or reducing the formation or growth of water trees which relate to the composition of the layers or the addition of inhibitors against the formation and growth of water trees.

For example, DE-A-29 48 492 discloses that the polyolefin material intended for the production of electrical medium and high voltage cables can be washed, after granulation and immediately before extrusion, with pure water in order to remove the small amounts of water-soluble and hygroscopic salts which cause the water trees (cf. also DE-A-29 11 756). The disadvantage of this known process is the relatively great expense, since the granules have to be dried with hot air after the wash process.

It is also already known to add to the polyolefin material intended for production of electrical medium and high voltage cables water tree inhibitors made of polymeric materials. For example, the literature recommends the following compounds for this purpose: organopolysiloxanes (cf. U.S. Pat. Nos. 4,492,647, 4,536,530 and EP-A-0 109 797), polyethylene glycols (cf. EP-A-0 057 604), epoxy resins (cf. Chem. Abstr. 96: 182235), ethylene/but-1-ene or ethylene/hex-1-ene copolymers (cf. Chem. Abstr. 101: 193825), polypropylene (cf. Chem. Abstr. 102: 8329), polybut-1-ene (cf. Chem. Abstr. 98: 5097), ethylene/vinyl acetate copolymers (cf. Chem. Abstr. 93: 169329), polystyrene and triallyl isocyanurate (cf. DD-A-160 808), ethylene/vinyl acetate or ethylene/alkyl acrylate copolymers grafted with styrene (cf. Chem. Abstr. 103: 7802), polyvinyl alcohol (cf. Chem. Abstr. 95: 204983), chlorosulfonated polyethylene (cf. Chem. Abstr. 95: 204981), polyamide (cf. Chem. Abstr. 96: 21007), ethylene/ethyl acrylate copolymer (cf. Chem. Abstr. 99: 177160) or a styrene copolymer, for example styrene/butadiene or styrene/isoprene rubber (cf. Chem. Abstr. 92: 7572).

In the known electrical medium and high voltage cables described above and based on polyolefins with added polymeric water tree inhibitors, the effects of, and the effect on, the water tree growth are very different; quantitative statements are lacking in most cases. Frequently, the added inhibitors have an adverse effect on other performance characteristics of the polyolefin mixtures and of the electrical medium and high voltage cables produced therewith.

Attempts have been made to overcome the disadvantages of the inhibitors known to date by the use of mixtures of ethylene homopolymers and/or copolymers (cf. U.S. Pat. No. 4,092,488, EP-A-0 248 148, EP-A-0 323 581, EP-A-0 341 621 and EP-A-0 358 082). However, regarding the resistance to the formation and growth of water trees, the relevant electrical medium and high voltage cables failed in particular where an electrically insulating layer is combined with an electrically semiconductive layer containing carbon black pigments. Here, extensive investigations have shown that the cause of the extremely pronounced formation and the extremely rapid growth of water trees is the low but technically unavoidable content of water-soluble basic salts in the electrically semiconductive layer.

It is an object of the present invention to provide novel electrical medium and high voltage cables which are based on ethylene homopolymers and/or copolymers, have improved performance characteristics and possess high resistance to the formation and growth of water trees even in the presence of water-soluble basic salts.

We have found that this object is achieved by the use of specially selected carboxylic acids and/or anhydrides of one or more of these carboxylic acids as inhibitors of the formation and of the growth of water trees in ethylene homopolymers and/or copolymers under the influence of strong electric fields. In view of the prior art, it was not to be expected that precisely the specially selected carboxylic acids and/or their anhydrides would effectively inhibit both water tree formation initiated by basic salts and further growth of the water trees.

The present invention accordingly relates to the use of carboxylic acids of the general formula I

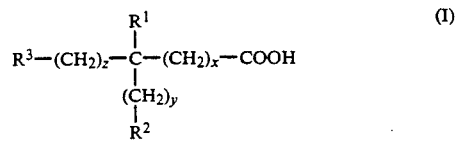

where $R^1$, $R^2$ and $R^3$ independently of one another are each hydrogen, hydroxyl, carboxyl or $C_1$–$C_6$-alkyl and x, y and z independently of one another are each 0 or an integer of from 1 to 6, and/or of the anhydrides of one or more of these carboxylic acids I as inhibitors of the formation or of the growth of water trees in ethylene homopolymers and/or copolymers under the influence of strong electric fields.

The carboxylic acids of the general formula I which are to be used according to the invention are, for the sake of brevity, referred to below as carboxylic acids I, and the anhydrides derived therefrom as anhydrides I.

The present invention furthermore relates to electrically insulating and electrically semiconductive mixtures based on ethylene homopolymers and/or copolymers, which contain one or more carboxylic acids I and/or one or more anhydrides I.

The present invention also relates to electrical medium and high voltage cables having electrically semiconductive and/or insulating layers consisting of the above-mentioned mixtures.

The present invention furthermore relates to a test method for determining the tendency of polymeric mixtures to form water trees under the influence of strong electric fields.

According to the invention, carboxylic acids I and/or anhydrides I are used as inhibitors of the formation and of the growth of water trees.

In the general formula I, x, y and z are each 0 or an integer of from 1 to 6, preferably 0 or from 1 to 3.

Examples of suitable $C_1$–$C_6$-alkyl groups $R^1$, $R^2$ and $R^3$ in the general formula I are methyl, ethyl, propyl, isopropyl, n-butyl, sec-butyl, tert-butyl, n-pentyl, amyl, neopentyl and n-hexyl.

Examples of suitable carboxylic acids I are accordingly acetic acid, propionic acid, butyric acid, isobutyric acid, valeric acid, isovaleric acid, pivalic acid, lauric acid, myristic acid, palmitic acid, stearic acid, malonic acid, succinic acid, glutaric acid, adipic acid, pimelic acid, suberic acid, azelaic acid, sebacic acid, malic acid, tartaric acid, racemic tartaric acid, tartronic acid, mesoxalic acid and citric acid. Among these, citric acid is very particularly preferably used.

Examples of suitable anhydrides I are accordingly the anhydrides of the abovementioned carboxylic acids I and the mixed anhydrides of two or more of the abovementioned carboxylic acids I.

Of all these anhydrides I, the anhydride of citric acid is very particularly preferably used.

In the embodiment preferred according to the invention, carboxylic acids I and/or anhydrides I are used in the ethylene homopolymers and/or copolymers in an amount of from 0.01 to 5% by weight, based on the total mixture. If less than 0.01% by weight is used, the inhibiting effect is no longer completely satisfactory. On the other hand, when the content of carboxylic acids I and/or anhydrides I increases to above 5% by weight, the increase in the inhibiting effect does not justify the greater material consumption and price. Furthermore, these large amounts of additives may adversely affect the mechanical properties of the relevant mixtures based on ethylene homopolymers and/or copolymers. Accordingly, the range from 0.01 to 5% by weight is an optimum range within which the content of carboxylic acids I and/or anhydrides I in the mixtures can be widely varied and excellently adapted to the particular technical problems. Within this optimum range, the range from 0.05 to 2% by weight is noteworthy because mixtures based on ethylene homopolymers and/or copolymers which have such a content are particularly suitable for the production of electrical medium and high voltage cables.

According to the invention, the carboxylic acids I and/or the anhydrides I display their inhibiting action in mixtures based on ethylene homopolymers and/or copolymers. This action is very particularly pronounced in mixtures which are based on ethylene homopolymers and/or copolymers and which are suitable for the production of electrically insulating and/or electrically semiconductive layers for limiting the electromagnetic field in electrical medium and high voltage cables.

Examples of ethylene homopolymers and copolymers which are very particularly suitable for this intended use are ethylene homopolymers having a low density, in particular a density of $<0.934$ g/cm$^3$ according to DIN 53479, ethylene copolymers with α-monoolefins which contain from 3 to 8 carbon atoms and whose content in the copolymer is from 5 to 15% by weight, ethylene/vinyl acetate copolymers which preferably contain from 0.5 to 20% by weight of polymerized vinyl acetate, ethylene/acrylate copolymers which preferably have from 0.5 to 20% by weight of polymerized acrylate, ionomers based on ethylene/acrylic acid copolymers or ethylene/acrylic acid/acrylate terpolymers and ethylene/acrylic acid/acrylate terpolymers and mixtures thereof.

Ethylene homopolymers and copolymers of the stated type are conventional and known and are described in, for example, U.S. Pat. No. 4,092,488, EP-A-0 248 148, EP-A-0 323 581, EP-A-0 341 621 or EP-A-0 358 082.

In addition to the carboxylic acids I and/or anhydrides I to be used according to the invention, the novel mixtures based on ethylene homopolymers and/or copolymers may contain further conventional and known additives, such as antioxidants, flameproofing agents, crosslinking assistants, such as triallyl cyanurate, and crosslinking agents, such as organic peroxides.

The above-mentioned novel mixtures have excellent electrically insulating properties and high resistance to the formation or the growth of water trees under the influence of strong electric fields. They are therefore very useful for the production of the electrically insulating layers of electrical medium and high voltage cables. The high resistance to the formation or the growth of water trees is also ensured in the presence of water-soluble basic salts, such as sodium or potassium carbonate or sodium nitrite.

Large amounts of electrically conductive pigments, e.g. N-vinylcarbazole, poly-N-vinylcarbazole or carbon black pigments, may furthermore be added to these electrically insulating mixtures based on ethylene homopolymers and/or copolymers and carboxylic acids I and/or anhydrides I, giving electrically semiconductive mixtures which, owing to their resistance to the formation and the growth of water trees under the influence of strong electric fields, are very useful for the production of the electrically semiconductive layers of electrical medium and high voltage cables. It is known that said layers serve in such cables to limit the electromagnetic field. The resistance of these novel electrically semiconductive mixtures to the formation or growth of water trees is so great that there is not even the feared initial growth of water trees at the interfaces between semiconductive layers and insulating layers in the relevant cable sheaths.

This unusually high and advantageous resistance can be very elegantly demonstrated by means of a novel test method for determining the tendency of polymeric mixtures to form water trees under the strong influence of electric fields. In this new test method, reagents which initiate water trees are applied in the form of a layer of finely divided small crystals to the surface of a first film or sheet of the polymeric mixture to be tested. According to the invention, the reagents used here are water-soluble basic salts, for example sodium or potassium carbonate or sodium nitrite. The size of the crystals is preferably about 10 μm. Thereafter, a second film or sheet of the same or of another polymeric mixture to be tested is placed on the layer of finely divided small crystals, resulting in a sandwich. The sandwich is then pressed at elevated temperatures, preferably at about 200° C., to a certain defined thickness, preferably 1 mm. The time required for this purpose is in general from 1 to 120 minutes and can be determined by the skilled worker by means of simple preliminary experiments. The test specimen is then exposed to an electric high voltage field at 100% atmospheric humidity. Advantageously, field strengths of above 1 kV/mm are used here. After exposure to the electric field, the number, the length and the structure of the resulting water trees in the test specimen are determined under an optical microscope. In the case of pigment-free test specimens, the number of water trees is determined in the beam parallel to the direction of the electric high voltage field to which the specimen was exposed. In the case of test specimens having a semiconductive layer, the number of water trees is determined using thin sections. The number of water trees formed is based on the number of crystals and expressed as an amount in % by weight. In general, the length of the water trees is determined using sections through the test specimen, the viewing direction being at right angles to the direction of the electric high voltage field to which the specimen was exposed.

This novel test is considerably more stringent than the conventional Cigré Task Force 15-06-05 test, which is carried out using sodium chloride crystals (cf. Cigré Symposium, Vienna, 1987, Conference Report S05-87, 620-10, M. Saure and W. Kolkner, On Water Tree Testing of Materials, Status Report of Cigré TF 15-06-05). In spite of these more stringent test conditions, the novel electrically insulating or semiconductive mixtures described above show no, or only comparatively little, tendency to form water trees under the influence of strong electric fields. On the other hand, the known electrically insulating and semiconductive mixtures give substantially poorer results in this test.

The preparation of the novel electrically insulating and semiconductive mixtures and of the relevant electrical medium and high voltage cables having one or more electrically semiconductive layers for limiting the electromagnetic field and one or more electrically insulating layers produced from the ethylene homopolymers and/or copolymers and the carboxylic acids I and/or anhydrides I to be used according to the invention and, if required, from the conventional and known additives has no special features attached to the method but is carried out by the conventional and known processes for the preparation and processing of polymeric mixtures, moldings and cable sheaths, for example extrusion, followed by thermal crosslinking and/or crosslinking by high energy radiation.

The electrical medium and high voltage cables produced with the aid of the novel electrically insulating or electrically semiconductive mixtures have an advantageously long life even under extremely unfavorable climatic conditions.

EXAMPLES 1 TO 6 AND COMPARATIVE EXPERIMENTS C1 TO C3

The preparation of novel (Examples 1 to 6) and conventional (Comparative Experiments C1 to C3) mixtures and their tendency to form water trees under the influence of strong electric fields Experimental method:

For Example 1, an ethylene homopolymer having a melt flow index of 2 g/10 min and a density of 0.918 g/cm$^3$ was mixed, according to Example 4 of EP-A-0 358 082, with an ionomer consisting of 92% by weight of polymerized ethylene and 8% by weight of polymerized acrylic acid in which 15 mol % of the carboxyl groups had been neutralized with triethanolamine, so that the resulting mixture contained 0.4% by weight of polymerized acrylic acid. This mixture of ethylene homopolymer and copolymer was provided with 0.3% by weight of 4,4'-thiobis-(6-tert-butyl-3-methylphenol) as a heat stabilizer, 1.8% by weight of dicumyl peroxide as a crosslinking agent and 0.5% by weight of citric acid, the percentages in each case being based on the total mixture.

Example 2 was carried out following the procedure described above, except that the anhydride of citric acid was used instead of citric acid.

For Example 3, 90% by weight of an ethylene polymer having a melt flow index of 2 g/10 min and a density of 0.918 g/cm$^3$ were mixed, according to Example 1 of EP-A-0 341 621, with 10% by weight of a copolymer of 88% by weight of polymerized ethylene and 12% by weight of polymerized but-1-ene, the percentages being based on the copolymer, having a density of 0.903 g/cm$^3$, a melt flow index of 1 g/10 min, a ratio $\overline{M}_w/\overline{M}_n$ of 6 and a crystallite melting point of 121° C. This mixture was provided with 0.3% by weight of 4,4'-thiobis-(6-tert-butyl-3-methylphenol) as a heat stabilizer, 1.8% by weight of dicumyl peroxide as a crosslinking agent and 0.5% by weight of citric acid, the percentages in each case being based on the total resulting mixture.

Example 4 followed the procedure in Example 3, but with the anhydride of citric acid being used instead of citric acid.

For Example 5, an ethylene homopolymer having a melt flow index of 2 g/10 min and a density of 0.918 g/cm$^3$ was mixed, according to Example 1 of EP-A-0 323 581, with a copolymer which consisted of, the percentages being based on the copolymer, 92% by weight of polymerized ethylene and 8% by weight of polymerized acrylic acid in which 30 mol % of the carboxyl groups have been neutralized with $Zn^{2+}$, so that the resulting mixture contained 1.6% by weight of polymerized acrylic acid. This mixture was provided, as described in Example 1 or 2, with a heat stabilizer and a crosslinking agent and with 0.5% by weight, based on the total resulting mixture, of citric acid.

Example 6 followed the procedure in Example 5, but with the anhydride of citric acid being used instead of citric acid.

In Comparative Experiments C1 and C3, the procedure was essentially the same as that in Examples 1 to 6, except that the conventional mixtures of the Comparative Experiments contained no citric acid.

In the conventional test for the formation and growth of water trees, sodium chloride in the form of small crystals (edge length 10 μm) was finely distributed as a layer in the novel mixtures of Examples 1 to 3 and in the conventional mixtures of Comparative Experiments C1 to C3. This was done by dusting the salt onto an uncrosslinked sheet of the relevant mixture. Thereafter, a second sheet of the relevant novel or conventional mixture was placed on top, after which the resulting sandwich was pressed at 200° C. for 10 minutes to a thickness of 1 mm. The relevant mixtures were thermally crosslinked during this procedure.

The resulting test specimens were then exposed to an electric field having a strength of 2.5 kV/mm at 100% atmospheric humidity.

After exposure to the electric field, the number, the length and the structure of the resulting water trees in the individual specimens were determined under an optical microscope. The number of water trees was determined in the beam parallel to the direction of the electric field to which the test specimen was exposed.

The number of water trees formed was based on the number of sodium chloride crystals and expressed as an amount in percent by weight.

This known test was repeated in the novel procedure using a water-soluble basic salt instead of sodium chloride. Since sodium nitrite had proved to be a particularly aggressive initiator of water trees, this salt was used instead of sodium chloride for the novel test.

The results obtained in the two tests are summarized in the Table.

The results show on the one hand that the known mixtures based on ethylene homopolymers and copolymers are stable to the formation and the growth of water trees in the presence of sodium chloride but that their resistance breaks down in the presence of the water-soluble basic salt sodium nitrite (cf. Comparative Experiments C1 to C3). On the other hand, the results show that not even sodium nitrite is capable of initiating water trees after 30 days in the novel mixtures of Examples 1 to 6.

TABLE

The formation of water trees in novel (Examples 1 to 6) and conventional (Comparative Experiments C1 to C3) mixtures, determined in the presence of sodium chloride and in the presence of $NaNO_2$

| Example No. | Impurity | Water trees after exposure for 30 days (% by weight) |
|---|---|---|
| 1 | NaCl | 0 |
|   | $NaNO_2$ | 0 |
| 2 | NaCl | 0 |
|   | $NaNO_2$ | 0 |
| 3 | NaCl | 0 |
|   | $NaNO_2$ | 0 |
| 4 | NaCl | 0 |
|   | $NaNO_2$ | 0 |
| 5 | NaCl | 0 |
|   | $NaNO_2$ | 0 |
| 6 | NaCl | 0 |
|   | $NaNO_2$ | 0 |
| Comparative Experiment |  |  |
| C1 | NaCl | 0 |
|   | $NaNO_2$ | 100 |
| C2 | NaCl | 0 |
|   | $NaNO_2$ | 100 |
| C3 | NaCl | 0 |
|   | $NaNO_2$ | 100 |

We claim:

1. An electrically semiconductive mixture based on ethylene homopolymers and/or copolymers, containing, based in each case on the mixture, from 10 to 50% by weight of an electrically conductive pigment and from 0.01 to 5% by weight of one or more compounds selected from the group consisting of the carboxylic acids of the formula I

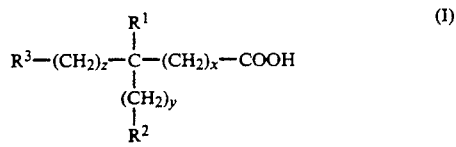

where $R^1$, $R^2$ and $R^3$ independently of one another are each hydrogen, hydroxyl or carboxyl and x, y and z independently of one another are each 0 or an integer of from 1 to 3, and the anhydrides of these carboxylic acids I.

2. A mixture as defined in claim 1, wherein the compound has been selected from the group consisting of acetic acid, propionic acid, butyric acid, isobutyric acid, valeric acid, isovaleric acid, pivalic acid, malonic acid, succinic acid, glutaric acid, adipic acid, pimelic acid, suberic acid, azelaic acid, malic acid, tartronic acid, mesoxalic acid and citric acid, and the simple and the mixed anhydrides of these carboxylic acids I.

3. A mixture as defined in claim 2, wherein the compound has been selected from the group consisting of citric acid and its anhydride.

* * * * *